(12) United States Patent
Shoji et al.

(10) Patent No.: US 11,015,234 B2
(45) Date of Patent: May 25, 2021

(54) ALUMINUM ALLOY CLADDING MATERIAL FOR HEAT EXCHANGER

(71) Applicant: UACJ CORPORATION, Tokyo (JP)

(72) Inventors: Tomohiro Shoji, Tokyo (JP); Naoki Yamashita, Tokyo (JP); Toshikazu Tanaka, Tokyo (JP); Hirokazu Tanaka, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 314 days.

(21) Appl. No.: 15/527,604

(22) PCT Filed: Nov. 18, 2015

(86) PCT No.: PCT/JP2015/082375
§ 371 (c)(1),
(2) Date: May 17, 2017

(87) PCT Pub. No.: WO2016/080434
PCT Pub. Date: May 26, 2016

(65) Prior Publication Data
US 2017/0321304 A1    Nov. 9, 2017

(30) Foreign Application Priority Data
Nov. 21, 2014   (JP) .............................. JP2014-236443

(51) Int. Cl.
*C22C 21/02* (2006.01)
*F28F 21/08* (2006.01)
(Continued)

(52) U.S. Cl.
CPC .............. *C22C 21/02* (2013.01); *B23K 35/28* (2013.01); *B32B 15/016* (2013.01); *C22C 21/00* (2013.01);
(Continued)

(58) Field of Classification Search
CPC .......... C22C 21/02; C22C 21/04; C22C 21/00; B23K 35/28; B32B 15/016; B32B 2250/03; F28F 21/08
See application file for complete search history.

(56) References Cited

U.S. PATENT DOCUMENTS

| | | | | |
|---|---|---|---|---|
| 4,649,087 A | * | 3/1987 | Scott | .................... B23K 35/286 420/529 |
| 4,749,627 A | * | 6/1988 | Ishikawa | ............ B23K 35/0238 165/177 |

(Continued)

FOREIGN PATENT DOCUMENTS

| | | |
|---|---|---|
| CN | 101871062 A | 10/2010 |
| JP | 6-182581 A | 7/1994 |

(Continued)

OTHER PUBLICATIONS

Hisatomi, et al., JP-2009161826-A. machine translation (Year: 2009).*

(Continued)

*Primary Examiner* — John A Hevey
(74) *Attorney, Agent, or Firm* — Westerman, Hattori, Daniels & Adrian, LLP (57) ABSTRACT

A three-layer clad material includes a core material, a cladding material 1, and a cladding material 2, the core material including an aluminum alloy that includes 0.5 to 1.8% of Mn, and either or both of more than 0.05% and less than 0.2% of Cu, and 0.05 to 0.30% of Ti, with the balance being Al and unavoidable impurities, the cladding material 1 including an aluminum alloy that includes 3 to 10% of Si, and 1 to 10% of Zn, with the balance being Al and unavoidable impurities, and the cladding material 2 including an aluminum alloy that includes 3 to 13% of Si, and 0.05% or less of Cu, with the balance being Al and unavoidable impurities, wherein the Si content X (%) in the cladding (Continued)

material 1 and the Si content Y (%) in the cladding material 2 satisfy the value (Y−X) is −1.5 to 9%.

7 Claims, 3 Drawing Sheets

(51) Int. Cl.
  *C22C 21/00* (2006.01)
  *C22C 21/04* (2006.01)
  *B32B 15/01* (2006.01)
  *B23K 35/28* (2006.01)

(52) U.S. Cl.
  CPC .............. *C22C 21/04* (2013.01); *F28F 21/08* (2013.01); *B32B 2250/03* (2013.01)

(56) References Cited

U.S. PATENT DOCUMENTS

| | | | | |
|---|---|---|---|---|
| 5,292,595 | A * | 3/1994 | Yamauchi | ............ B23K 35/286 165/134.1 |
| 6,921,584 | B2 | 7/2005 | Syslak et al. | |
| 9,012,033 | B2 * | 4/2015 | Matsuo | ................. B32B 15/016 165/905 |
| 9,744,610 | B2 * | 8/2017 | Terada | ............... B23K 35/0222 |
| 2011/0111254 | A1 | 5/2011 | Wittebrood et al. | |
| 2012/0129003 | A1 | 5/2012 | Ando et al. | |
| 2013/0157080 | A1 * | 6/2013 | Terada | ............... B23K 35/0238 428/654 |
| 2014/0033534 | A1 * | 2/2014 | Wintersteen | ......... B23K 1/0012 29/890.047 |
| 2017/0321974 | A1 * | 11/2017 | Otsuki | .................... C22C 21/02 |

FOREIGN PATENT DOCUMENTS

| | | | |
|---|---|---|---|
| JP | 9-138093 | A | 5/1997 |
| JP | 2003-27165 | A | 1/2003 |
| JP | 2004-218045 | A | 8/2004 |
| JP | 2004-225061 | A | 8/2004 |
| JP | 2005-16937 | A | 1/2005 |
| JP | 2005-307251 | A | 11/2005 |
| JP | 2005-314719 | A | 11/2005 |
| JP | 2007-178062 | A | 7/2007 |
| JP | 2009161826 | A * | 7/2009 |
| JP | 2010-197002 | A | 9/2010 |
| JP | 2010-255012 | A | 11/2010 |
| JP | 2010-255013 | A | 11/2010 |
| JP | 4698416 | B2 | 6/2011 |
| JP | 2013-133517 | A | 7/2013 |
| JP | 2014-84521 | A | 5/2014 |

OTHER PUBLICATIONS

JIS Handbook 3 Hitetsu "Aluminum alloy brazing filler metals and blazing sheets", Japanese Standards Association, pp. 776-779, Jan. 19, 2007 (cited in ISR).
International Search Report dated Feb. 16, 2016, issued in counterpart International Application No. PCT/JP2015/082375 (2 pages).
Office Action dated Mar. 2, 2018, issued in counterpart Chinese Application No. 201580063096.9, with English translation. (16 pages).
Office Action dated Jan. 4, 2019, issued in counterpart CN Application No. 201580063096.9, with English translation. (10 pages).
English translation of the JIS Handbook 3 Hitetsu "Aluminum alloy brazing filler metals and blazing sheets", Japanese Standards Association, pp. 776-779, Jan. 19, 2007 (cited in ISR).
Notice of Allowance dated May 20, 2020, issued in U.S. Appl. No. 15/528,256 (8 pages).
Non-Final Office Action dated May 23, 2019, issued in U.S. Appl. No. 15/528,256. (22 pages).
Extended (Supplementary) European Search Report dated Mar. 26, 2018, issued in application No. 15860205.2. (11 pages).
International Search Report dated Feb. 16, 2016, issued in application No. PCT/JP2015/082374 (counterpart to U.S. Appl. No. 15/528,256). (2 pages).

* cited by examiner

ALUMINUM ALLOY CLADDING MATERIAL FOR HEAT EXCHANGER

TECHNICAL FIELD

The present invention relates to an aluminum alloy clad material for heat exchangers that exhibits excellent brazability and excellent external surface corrosion resistance, and is suitable for use as a tube material or a tank or header material in an aluminum alloy heat exchanger manufactured by brazing.

BACKGROUND ART

An aluminum alloy is normally used for an automotive heat exchanger (e.g., evaporator and condenser) due to a reduced weight and excellent thermal conductivity.

Such a heat exchanger is produced by forming a refrigerant (working fluid) tube by bending a sheet material, or stacking a plurality of sheet materials formed by press working, assembling a member such as a fin material with the refrigerant tube to form a specific structure, and effecting brazing using a fluoride flux in an inert gas atmosphere.

In recent years, a reduction in weight has been desired for materials for producing a heat exchanger along with a reduction in weight of automobiles, and it is necessary to increase the strength of a sheet material used to form a refrigerant tube, or provide a thin material with formability, brazability, and corrosion resistance.

For example, the external side of an evaporator is exposed to a corrosive environment due to dew condensation water produced during use, and the external side of a condenser is exposed to a corrosive environment during run due to road splash that contains salt as snow melting agent. If the refrigerant tube is perforated in the short time due to corrosion, the refrigerant leaks, and the function of the heat exchanger is impaired. Therefore, the external surface (i.e., the side that comes on the air side) of the refrigerant tube is normally provided with an anti-corrosive treatment to increase the life of the heat exchanger.

For example, a flat tube produced by forming a sheet material that is clad with an Al—Zn-based alloy (sacrificial anode material) may be used as the refrigerant tube, or the refrigerant tube may be formed by pressing and stacking. However, a heat exchanger normally has a structure in which a fin is jointed to the external surface of the refrigerant tube. Since a filler metal is not provided to the external surface of the refrigerant tube when the above methods are used, it is necessary to use a fin material that is clad with a filler metal. In this case, the self-corrosion resistance of the fin material may decrease due to the filler metal that remains on the surface of the fin, or the production cost of the heat exchanger may increase since the production cost of the clad fin material is higher than that of the bare fin.

When a bare material is used for the fin that is jointed to the external surface of the refrigerant tube, the self-corrosion resistance of the fin can be improved. Moreover, the performance of the heat exchanger can be improved by utilizing a highly conductive material. It is also possible to reduce cost as compared with the case of using a clad fin material. In this case, since it is necessary to provide a filler metal to the external surface of the refrigerant tube, a filler metal powder may be applied to the surface of the Al—Zn-based alloy, or a sheet material that is clad with an Al—Si-based alloy filler metal that includes Zn may be used. When a filler metal powder is applied to the surface of the Al—Zn-based alloy, however, the production cost of the heat exchanger increases since the filler metal powder is expensive. When a sheet material that is clad with an Al—Si-based alloy filler metal that includes Zn is used, since the molten filler metal that includes Zn flows during brazing, the amount of Zn that remains on the external surface of the refrigerant tube after brazing may be insufficient to provide a sacrificial anode material, and the refrigerant tube may not exhibit sufficient corrosion resistance, or the molten filler metal that includes Zn may flow to the joint, and the joint may be preferentially corroded.

In order to solve the above problems, a method has been proposed in which Si is added to an Al—Zn-based sacrificial anode material with which the external surface of the refrigerant tube is clad, at a concentration lower than the Si concentration in a ordinary Al—Si-based alloy filler metal, a bare fin material is jointed by melting part of the sacrificial anode material, and a phenomenon in which Zn included in the sacrificial anode material flows during brazing is suppressed by reducing the amount of liquid filler as compared with a known Al—Si-based alloy filler metal so that a sufficient amount of Zn remains on the external surface of the refrigerant tube after brazing to provide a sacrificial anode effect.

According to this method, however, a sufficient amount of liquid filler for jointing the bare fin material may not be obtained if the amount of Si is not appropriate. Moreover, self-corrosion resistance may decrease if an inappropriate element is added in addition to Si. Even if the amount of Si is appropriate, and an appropriate element is added, the solidified structure formed by brazing has a primary phase and a eutectic phase. Since the potential of the eutectic phase is lower than that of the primary phase, preferential corrosion of the eutectic phase occurs, and the primary phase that serves as a sacrificial anode material falls off in the short time. As a result, corrosion resistance decreases.

In order to coarsen the primary phase, suppress a situation in which the primary phase falls off even when the eutectic phase is preferentially corroded, and form a low-potential area in the primary phase, a method has been proposed in which Mn is added to the external side cladding material to coarsen the primary phase, and suppress a situation in which the primary phase falls off. According to this method, an Al—Mn—Si-based compound is formed in the primary phase, and an Mn/Si-deficient layer that is formed around the Al—Mn—Si-based compound serves as a low-potential area, so that the preferential corrosion of the eutectic phase is relatively suppressed.

When a sheet material of which the external surface is clad with an Al—Si—Zn-based alloy, and the internal surface is clad with an Al—Si-based alloy, is used to form a joint that isolates the refrigerant passage from air (e.g., drawn cup-type heat exchanger), a molten filler metal flows from the internal side toward the joint during brazing when the Si content in the internal surface is set to be higher than the Si content in the external surface, so that it is possible to reduce a situation in which a Zn-containing molten filler metal is concentrated at the joint, and suppress a situation in which the joint is preferentially corroded.

However, when the internal surface Si content is significantly higher than the external surface Si content, a molten filler metal flows from the joint toward the external surface, and the Zn concentration in the external surface filler metal decreases. As a result, the Zn concentration in the vicinity of the joint significantly decreases during brazing, and it is difficult to obtain a sufficient sacrificial anode effect.

CITATION LIST

Patent Literature

Patent Literature 1: JP-A-2004-225061
Patent Literature 2: JP-A-2005-16937
Patent Literature 3: JP-A-2005-307251
Patent Literature 4: JP-A-2005-314719
Patent Literature 5: JP-A-2007-178062
Patent Literature 6: JP-A-2010-255012
Patent Literature 7: JP-A-2010-255013
Patent Literature 8: Japanese Patent No. 4698416

SUMMARY OF INVENTION

Technical Problem

This invention was conceived as a result of extensive tests and studies conducted with regard to the relationship between the composition of the external surface cladding material, the core material, and the internal surface cladding material, the brazability of the external surface cladding material and the bare fin material that is jointed to the external surface cladding material by brazing, and the sacrificial anode properties of the external surface cladding material, in order to solve the above problems to obtain external surface brazability and external surface corrosion resistance at the same time. An object of the invention is to provide an aluminum alloy clad material for heat exchangers that exhibits excellent brazability and excellent external surface corrosion resistance, and is suitable for use as a tube material or a tank or header material in an aluminum alloy heat exchanger manufactured by brazing.

Solution to Problem

According to one aspect of the invention, an aluminum alloy clad material for heat exchangers is a three-layer clad material that includes a core material, a cladding material 1, and a cladding material 2, one side of the core material being clad with the cladding material 1, the other side of the core material being clad with the cladding material 2, the core material including an aluminum alloy that includes 0.5 to 1.8% of Mn, and either or both of more than 0.05% and less than 0.2% of Cu, and 0.05 to 0.30% of Ti, with the balance being Al and unavoidable impurities, the cladding material 1 including an aluminum alloy that includes 3 to 10% of Si, and 1 to 10% of Zn, with the balance being Al and unavoidable impurities, and the cladding material 2 including an aluminum alloy that includes 3 to 13% of Si, and 0.05% or less of Cu, with the balance being Al and unavoidable impurities, wherein the Si content X (%) in the cladding material 1 and the Si content Y (%) in the cladding material 2 satisfy the value (Y−X) is −1.5 to 9%, and the aluminum alloy clad material is used in a state in which the cladding material 1 comes on the air side. Note that the unit "%" used in connection with the content of each alloy component refers to "mass %".

In the aluminum alloy clad material for heat exchangers according to one aspect of the invention, the core material may further include either or both of 0.30% or less of Cr and 0.30% or less of Zr.

In the aluminum alloy clad material for heat exchangers according to one aspect of the invention, the core material may further include 0.5% or less of Mg.

In the aluminum alloy clad material for heat exchangers according to one aspect of the invention, the cladding material 1 may further include 0.3 to 1.8% of Mn.

In the aluminum alloy clad material for heat exchangers according to one aspect of the invention, the cladding material 1 may further include 0.005 to 0.05% of Sr.

In the aluminum alloy clad material for heat exchangers according to one aspect of the invention, the core material may further include either or both of 0.30% or less of Cr and 0.30% or less of Zr.

In the aluminum alloy clad material for heat exchangers according to one aspect of the invention, the cladding material 1 may further include either or both of 0.001 to 0.10% of In and 0.001 to 0.10% of Sn.

In the aluminum alloy clad material for heat exchangers according to one aspect of the invention, the cladding material 1 may have an Ni content of less than 0.05%.

In the aluminum alloy clad material for heat exchangers according to one aspect of the invention, the cladding material 2 may further include 0.005 to 0.05% of Sr.

Advantageous Effects of Invention

One aspect of the invention thus provides an aluminum alloy clad material for heat exchangers that exhibits excellent brazability and excellent external surface corrosion resistance, and is suitably used as a tube material or a tank/header material for an aluminum alloy heat exchanger that is produced by brazing.

DESCRIPTION OF EMBODIMENTS

Figure 1:
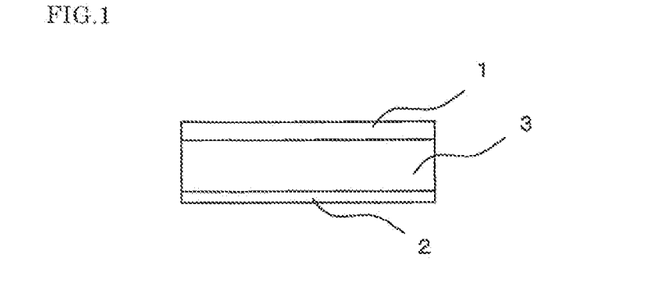
FIG. 1 is a schematic view illustrating a three-layer clad material according to one embodiment of the invention.

As illustrated in FIG. 1, a three-layer aluminum alloy clad material according to one embodiment of the invention is a material in which one side of a core material 3 is clad with a cladding material 1, and the other side of the core material 3 is clad with a cladding material 2. For example, when a refrigerant tube is produced using the clad material, the clad materials according to one embodiment of the invention are formed so that the cladding material 1 forms a convex surface, and the cladding material 2 forms a concave surface, assembled so that the concave surfaces face each other, and subjected to brazing to form a plurality of refrigerant passages 4 (see FIG. 2) (first embodiment). When the refrigerant tube has been completed, the cladding material 1 comes on the air side, and the cladding material 2 comes in contact with a refrigerant so that heat is exchanged between the refrigerant and the air. Although FIG. 2 illustrates an example in which the refrigerant tube includes a plurality of refrigerant passages 4, the refrigerant tube may include only one refrigerant passage 4.

Figure 3:
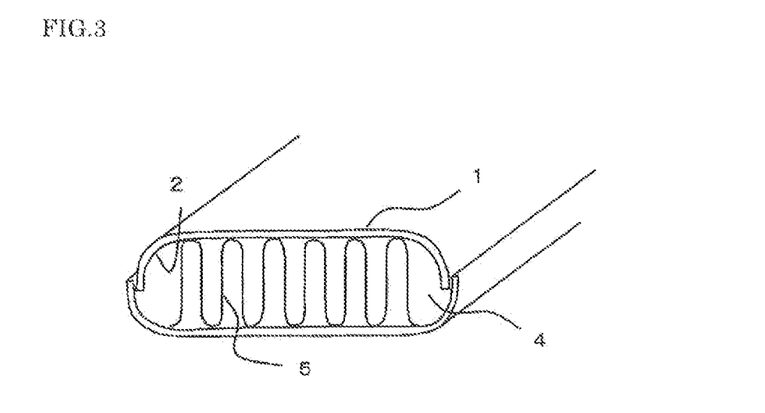
FIG. 3 is a schematic view illustrating another refrigerant tube that is formed using a three-layer clad material.

As illustrated in FIG. 3 (second embodiment), the clad materials according to one embodiment of the invention may be formed so that the cladding material 1 forms a convex surface, and the cladding material 2 forms a concave surface, assembled so that the concave surfaces face each other, and subjected to brazing to form a refrigerant tube. When the refrigerant tube has been completed, the cladding material 1 comes on the air side, and the cladding material 2 comes in contact with a refrigerant so that heat is exchanged between the refrigerant and the air. As illustrated in FIG. 3, a corrugated bare fin 5 may be placed within the refrigerant passage 4.

Figure 2:
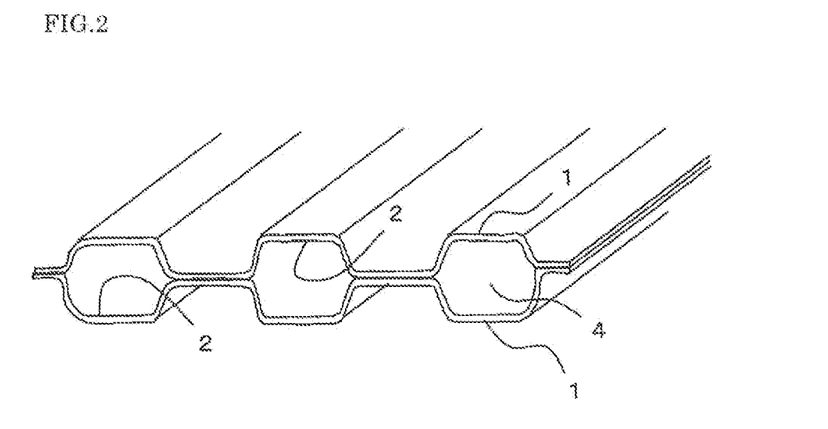
FIG. 2 is a schematic view illustrating a refrigerant tube that is formed using a three-layer clad material.

The clad materials illustrated in FIG. 2 may be combined so that the convex surfaces face each other, and the end of the lower clad material may be bent in the shape of the character "U" so as to engage with the horizontal end of the upper clad material, followed by brazing to form the end of the refrigerant tube (third embodiment).

The effect of each alloy component included in the aluminum alloy clad material according to the embodiments of the invention, and the reason that the content of each alloy component in the aluminum alloy clad material is limited as described above, are described below.

Core Material

Mn

Mn improves the strength of the core material. The Mn content in the core material is preferably 0.5 to 1.8%. If the Mn content in the core material is less than 0.5%, the strength of the core material may not be sufficiently improved. If the Mn content in the core material exceeds 1.8%, deterioration in rolling workability may occur. The Mn content in the core material is more preferably 1.0 to 1.7%.

Cu

Cu increases the potential of the core material, and improves the corrosion resistance of the core material. The Cu content in the core material is preferably more than 0.05% and less than 0.2%. If the Cu content in the core material is 0.05% or less, a sufficient effect may not be obtained. If the Cu content in the core material is 0.2% or more, the potential of the external surface cladding material may decrease during brazing due to diffusion of Cu into the external surface cladding material, and the sacrificial anode effect may decrease.

Ti

Ti increases the potential of the core material, and improves the corrosion resistance of the core material. Ti causes a high-Ti-concentration area and a low-Ti-concentration area to be distributed in layers in the core material in the thickness direction. Since the low-Ti-concentration area is preferentially corroded as compared with the high-Ti-concentration area, corrosion occurs in layers in the thickness direction. This suppresses the progress of corrosion in the thickness direction. The Ti content in the core material is preferably 0.05 to 0.30%. If the Ti content in the core material is less than 0.05%, a sufficient effect may not be obtained. If the Ti content in the core material exceeds 0.30%, a coarse crystallized product may be produced during casting, and it may be difficult to produce a sound sheet material.

Cr and Zr

Cr and Zr increase the grain size of the core material. When the grain size is increased, it is possible to suppress a situation in which a molten filler metal enters the crystal grain boundary during brazing, and erosion occurs. The Cr content and the Zr content in the core material are preferably 0.30% or less. If the Cr content and the Zr content in the core material exceed 0.30%, a coarse compound may be produced during casting, and it may be difficult to produce a sound sheet material.

Mg

Mg improves the strength of the core material. However, Mg diffuses from the core material into the filler metal during brazing, and reacts with a fluoride flux applied to the surface of the core material to form a compound having a high melting point. This decreases the activity of the flux, whereby brazability deteriorates. If the Mg content in the core material exceeds 0.5%, the above phenomenon may occur significantly. Therefore, the Mg content in the core material is limited to 0.5% or less. The Mg content in the core material is preferably 0.3% or less.

The core material normally includes about 0.1 to 0.2% of Fe as an unavoidable impurity. The Fe content in the core material may be reduced to 0.1% or less in order to further improve the corrosion resistance of the core material. Alternatively, 1.0% or less of Fe may be added to the core material in order to improve the strength of the core material. The advantageous effects of the invention are not impaired even when the core material includes 0.3% or less of V, 0.3% or less of Mo, 0.3% or less of Ni, 0.1% or less of Pb, 0.1% or less of Li, 0.1% or less of Ca, and 0.1% or less of Na. 0.1% or less of B may be added to the core material in order to prevent oxidation, and 0.1% or less of Sr may be added to the core material in order to promote refinement of the solidified structure of the filler metal through diffusion of Sr into the filler metal. The advantageous effects of the invention are not impaired even when the core material includes about 0.4% or less of Si as an unavoidable impurity.

Cladding Material 1 (External Surface Cladding Material)

Si

When an appropriate amount of Si is added to the external surface cladding material, a small amount of liquid filler is formed in the external surface cladding material, and a bare fin material or an aluminum sheet material can be jointed to the external surface cladding material. The Si content in the external surface cladding material is preferably 3 to 10%. If the Si content in the external surface cladding material is less than 3%, a sufficient liquid filler may not be formed, and a sufficient fillet may not be formed at the joint between the external surface cladding material and a bare fin material or an aluminum sheet material. If the Si content in the external surface cladding material exceeds 10%, most of the external surface cladding material may be melted, and Zn added to the external surface cladding material may also flow during brazing. As a result, the external surface cladding material may not serve as a sacrificial anode material. The Si content in the external surface cladding material is more preferably 3.5 to 8.5%.

Zn

Zn included in the external surface cladding material diffuses into the core material during brazing to form a Zn concentration gradient in the core material along the thickness direction. The potential of the external surface cladding material thus becomes lower than that of the core material, and the external surface cladding material serves as a sacrificial anode material to suppress the progress of corrosion in the thickness direction. The external surface cladding material used in connection with the invention includes Si. Si increases the potential of the external surface cladding material upon dissolution to counterbalance the potential-decreasing effect of Zn. Since Zn is included in the liquid filler that is formed due to the addition of Si, the amount of residual Zn decreases. The Zn content in the external surface cladding material is preferably 1 to 10%. If the Zn content in the external surface cladding material is less than 1%, a sufficient potential-decreasing effect may not be obtained. If the Zn content in the external surface cladding material exceeds 10%, a sufficient potential-decreasing effect is obtained, but a fillet formed at the joint may be corroded in the short time. The Zn content in the external surface cladding material is more preferably 2 to 9%.

Mn

The external surface cladding material used in connection with the invention includes Si, and part of Si included in the external surface cladding material is melted during brazing to form a solidified structure. Therefore, the external surface cladding material includes a primary phase and a eutectic phase. Since the potential of the eutectic phase is lower than that of the primary phase, the eutectic phase is preferentially corroded as compared with the primary phase. If the eutectic phase is corroded, the primary phase is isolated, and falls off. If the primary phase that has a sacrificial anode effect falls off, the sacrificial anode material disappears without exerting the sacrificial anode effect. Therefore, the core material is corroded in the short time, and perforation corrosion occurs. In order to suppress the above phenomenon, it is necessary to coarsen the primary phase so that the primary phase does not easily fall off even when the eutectic phase has been preferentially corroded, and form a low-potential area in the primary phase. Since the primary phase is coarsened by adding Mn to the external surface cladding material, it is possible to suppress a situation in which the primary phase falls off. Moreover, an Al—Mn—Si-based compound is formed in the primary phase, and an Mn/Si-deficient layer that is formed around the Al—Mn—Si-based compound serves as a low-potential area, so that the preferential corrosion of the eutectic phase is relatively suppressed. The Mn content in the external surface cladding material is preferably 0.3 to 1.8%. If the Mn content in the external surface cladding material is less than 0.3%, a sufficient effect may not be obtained. If the Mn content in the external surface cladding material exceeds 1.8%, the Si concentration in the external surface cladding material may significantly decrease due to formation of an Al—Mn—Si compound, whereby the amount of liquid filler to be formed may decrease. The Mn content in the external surface cladding material is more preferably 0.3 to 1.3%.

Sr

Sr finely disperses the Si particles included in the external surface cladding material, so that the liquid filler of a molten filler metal formed during brazing are easily jointed to each other. This makes it possible to improve the fluidity of the liquid filler, and achieve excellent brazability. The Sr content in the external surface cladding material is preferably 0.005 to 0.05%. If the Sr content in the external surface cladding material is less than 0.005%, a sufficient effect may not be obtained. If the Sr content in the external surface cladding material exceeds 0.05%, a coarse Al—Si—Sr-based compound may be produced, and the effect may deteriorate.

Cr and Zr

Cr and Zr coarsen the primary phase included in the solidified structure of the external surface cladding material (cladding material 1) after brazing. It is possible to suppress a situation in which the primary phase falls off by coarsening the primary phase. The Cr content and the Zr content in the external surface cladding material are preferably 0.30% or less. If the Cr content and the Zr content in the external surface cladding material exceed 0.30%, a coarse compound may be produced during casting, and brazability may be impaired.

In and Sn

A potential-decreasing effect is obtained by adding a small amount of In and Sn. Therefore, the potential of the external surface cladding material becomes lower than that of the core material by adding In and Sn to the external surface cladding material, so that a sacrificial anode effect can be obtained. The In content and the Sn content in the external surface cladding material are preferably 0.001 to 0.10%, respectively. If the In content and the Sn content in the external surface cladding material are less than 0.001%, a sufficient effect may not be obtained. If the In content and the Sn content in the external surface cladding material exceed 0.10%, deterioration in self-corrosion resistance may occur. The In content and the Sn content in the external surface cladding material are more preferably 0.01 to 0.04%, respectively.

Ni

Ni forms an Al—Ni-based compound. Since the Al—Ni-based compound serves as a cathode, the self-corrosion resistance of the external surface cladding material (sacrificial anode material) decreases, whereby corrosion is promoted, and perforation corrosion occurs in the short time. The above phenomenon may occur significantly when the Ni content in the external surface cladding material is 0.05% or more. Therefore, the Ni content in the external surface cladding material is preferably limited to less than 0.05%.

The external surface cladding material includes about 0.1 to 0.2% of Fe as an unavoidable impurity. The Fe content in the external surface cladding material may be reduced to 0.1% or less in order to further improve the corrosion resistance of the external surface cladding material. Alternatively, 1.0% or less of Fe may be added to the external surface cladding material in order to improve the strength of the external surface cladding material. The advantageous effects of the invention are not impaired even when the external surface cladding material includes 0.3% or less of V, 0.3% or less of Mo, 0.1% or less of Pb, 0.1% or less of Li, 0.1% or less of Ca, and 0.1% or less of Na. 0.1% or less of B may be added to the external surface cladding material in order to prevent oxidation.

Cladding Material 2 (Internal Surface Cladding Material)

Si

When the clad material according to the exemplary embodiments of the invention is used as a refrigerant tube, it is necessary to form a refrigerant passage by assembling the formed clad materials so as to face each other, or jointing the formed clad material to another member (see FIGS. 2 and 3). Therefore, it is necessary to add Si to the internal surface cladding material to obtain an ordinary Al—Si-based alloy filler metal. The Si content in the internal surface cladding material is preferably 3 to 13%. If the Si content in the internal surface cladding material is less than 3%, a sufficient amount of filler metal may not be melted, and the internal surface cladding material may not sufficiently serve as a filler metal. If the Si content in the internal surface cladding material exceeds 13%, primary-phase Si may be crystallized, and it may be difficult to produce a sound material.

When a refrigerant passage is formed by assembling the formed clad materials so as to face each other, a molten filler metal may flow during brazing from the external surface cladding material that includes Zn toward the joint, and the joint may be preferentially corroded. In this case, when the Si content in the internal surface cladding material is increased, a molten filler metal flows during brazing from the internal surface cladding material toward the joint, and it is possible to suppress a situation in which a molten filler metal that flows from the external surface cladding material that includes Zn is concentrated at the joint, and the joint is preferentially corroded. However, if the Si concentration in the internal surface cladding material is too high, a molten filler metal flows from the internal surface cladding material toward the external surface, and the Zn concentration in the external surface filler metal decreases, whereby the Zn concentration in the vicinity of the joint significantly decreases after brazing, and a sufficient sacrificial anode effect is not obtained.

It was found that it is possible to suppress a situation in which the joint is preferentially corroded, and obtain a sacrificial anode effect in the vicinity of the joint, when the Si content X (%) in the external surface cladding material (filler metal) and the Si content Y (%) in the internal surface cladding material (filler metal) satisfy the value (Y−X) is −1.5 to 9%. If the value (Y−X) is less than −1.5%, Zn included in the external surface cladding material (filler metal) may be concentrated at the joint, and the joint may be preferentially corroded. When the value (Y−X) is −1.5 to 0%, Zn included in the external surface cladding material (filler metal) may flow toward the joint, but the joint is not preferentially corroded since the Zn concentration at the joint is lower than the external surface Zn concentration. The value (Y−X) is more preferably 0 to 8.5%, still more preferably 0.2 to 7.5%, and most preferably 0.5 to 6.5%, in order to prevent a situation in which Zn flows toward the joint.

Sr

Sr finely disperses the Si particles included in the internal surface cladding material, so that the liquid filler of a molten filler metal formed during brazing are easily jointed to each other. This makes it possible to improve the fluidity of the liquid filler, and achieve excellent brazability. The Sr content in the internal surface cladding material is preferably 0.005 to 0.05%. If the Sr content in the internal surface cladding material is less than 0.005%, a sufficient effect may not be obtained. If the Sr content in the internal surface cladding material exceeds 0.05%, a coarse Al—Si—Sr-based compound may be produced, and the effect may deteriorate.

Cu

When the internal surface cladding material includes Cu, Cu included in the internal surface cladding material (filler metal) may move to the outer surface (may be scattered on the outer surface) in an area in which the internal surface cladding material and the external surface cladding material are situated close to each other (see the second embodiment (see FIG. 3) and the third embodiment) due to the flow of a molten filler metal from the internal surface cladding material during brazing. In this case, the Cu-containing area having a potential-increasing effect may serve as a cathode, and promote corrosion in the peripheral area. The above phenomenon significantly occurs when the Cu content in the internal surface cladding material exceeds 0.05%. Therefore, the Cu content in the internal surface cladding material is preferably limited to 0.05% or less, and more preferably 0.03% or less.

The internal surface cladding material normally includes about 0.1 to 0.2% of Fe as an unavoidable impurity. The Fe content in the internal surface cladding material may be reduced to 0.1% or less in order to further improve the corrosion resistance of the internal surface cladding material. Alternatively, 1.0% or less of Fe may be added to the internal surface cladding material in order to improve the strength of the internal surface cladding material. The advantageous effects of the invention are not impaired even when the internal surface cladding material includes 0.3% or less of V, 0.3% or less of Mo, 0.3% or less of Ni, 0.1% or less of Pb, 0.1% or less of Li, 0.1% or less of Ca, and 0.1% or less of Na. 0.1% or less of B may be added to the internal surface cladding material in order to prevent oxidation.

The clad material according to one embodiment of the invention is produced by subjecting each of an aluminum alloy for producing the core material, an aluminum alloy for producing the cladding material 1 (external surface cladding material), and an aluminum alloy for producing the cladding material 2 (internal surface cladding material), to continuous casting, homogenizing the resulting ingot according to an ordinary method, hot-rolling the ingot of the aluminum alloy for producing the cladding material 1, and the ingot of the aluminum alloy for producing the cladding material 2, cladding the ingot of the aluminum alloy for producing the core material with the ingot of the aluminum alloy for producing the cladding material 1, and the ingot of the aluminum alloy for producing the cladding material 2, and subjecting the resulting laminate to hot clad rolling, optional process inter-annealing, cold rolling, and final annealing.

EXAMPLES

The invention is further described below by way of examples and comparative examples to demonstrate the advantageous effects of the invention. Note that the following examples are provided for illustration purposes only, and the invention is not limited thereto.

Example 1

Each of an aluminum alloy for producing an external surface cladding material (cladding material 1) having the composition shown in Table 1, an aluminum alloy for producing a core material having the composition shown in Table 1, and an aluminum alloy for producing an internal surface cladding material (cladding material 2) having the composition shown in Table 1, was subjected to continuous casting, and the resulting ingot was homogenized according to an ordinary method. The ingot of the aluminum alloy for producing the cladding material 1, and the ingot of the aluminum alloy for producing the cladding material 2 were hot-rolled, and placed on the ingot of the aluminum alloy for producing the core material according to the combination shown in Table 1 so that the thickness ratio of the cladding material 1, the core material, and the cladding material 2 was 10%/80%/10%. The resulting laminate was subjected to hot clad rolling, cold rolling, optional process annealing, and final annealing to produce a three-layer clad material (O-temper material) having a thickness of 0.30 mm.

The resulting clad material was subjected to the following Tests 1 to 5. The test results are listed in Table 2.

Test 1: Tensile Test

The clad material was cut to have a size of 100×250 mm. About 5 g/m$^2$ of a fluoride-based flux was applied to each side of the clad material, and dried. The clad material was then subjected to brazing by heating the clad material to 600° C. (maximum temperature) in a nitrogen gas atmosphere at an average heating rate of 50° C./min. A JIS Z 2201 No. 5 specimen was prepared using the clad material, and subjected to a tensile test at room temperature in accordance with JIS Z 2241. A case where the tensile strength was more than 70 MPa was evaluated as "Good", and a case where the tensile strength was 70 MPa or less was evaluated as "Bad".

Test 2: Inverted-T Test

Figure 4:
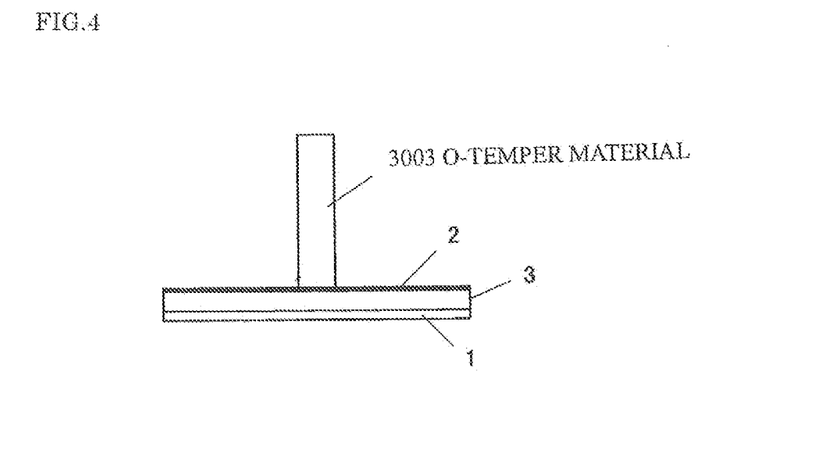
FIG. 4 is a view illustrating the state (before brazing) of an inverted-T test specimen used for a brazing test.
Figure 5:
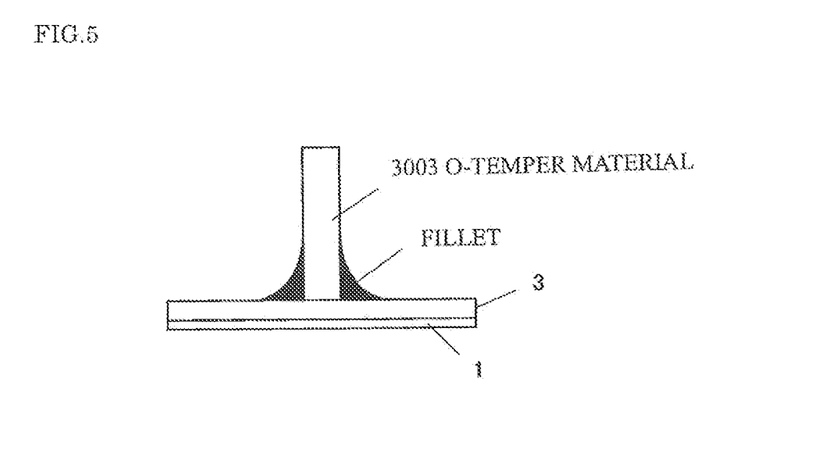
FIG. 5 is a view illustrating the state (after brazing) of an inverted-T test specimen used for a brazing test.

The clad material was cut to have a size of 25×50 mm, and subjected to an inverted-T test for evaluating brazability (horizontal plate: cladding material 2, vertical plate: 3003 alloy sheet (25×50×1.0 (thickness) mm, O-temper)) (see FIGS. 4 and 5). The jointed sample was buried in a resin, and the cross-sectional area of a fillet formed at the joint with the vertical plate was measured. The ratio of the cross-sectional area of the fillet after brazing to the cross-sectional area of the cladding material 2 before brazing was calculated, and taken as the flow factor determined by the inverted-T test. A case where the flow factor was 0.15 or more was evaluated as "Good", and a case where the flow factor was less than 0.15 was evaluated as "Bad".

Test 3: Mini-Core Test

The clad material was cut to have a size of 25×100 mm. A corrugated bare fin material (fin height: 10 mm, fin pitch: 4 mm) made of a 3003 alloy (thickness: 0.07 mm, H14 temper) was placed between two clad materials, and the laminate was secured using a jig so that the cladding material 1 was situated to be jointed to the fin material. About 5 g/m$^2$ of a fluoride-based flux was sprayed onto the jointed area, and dried. The laminate was then brazed by heating the laminate to 600° C. (maximum temperature) in a nitrogen gas atmosphere at an average heating rate of 50° C./min. The sample that was jointed in the shape of a mini-core was buried in a resin, and the cross-sectional area of a fillet formed at the joint with the fin was measured. The ratio of the cross-sectional area of the fillet after brazing to the cross-sectional area of the cladding material 1 before brazing was calculated, and taken as the flow factor determined by the mini-core test. The brazability was evaluated as "Good" when the flow factor was 0.05 or more, and was evaluated as "Bad" when the flow factor was less than 0.05.

Test 4: Corrosion Test A

Figure 6:
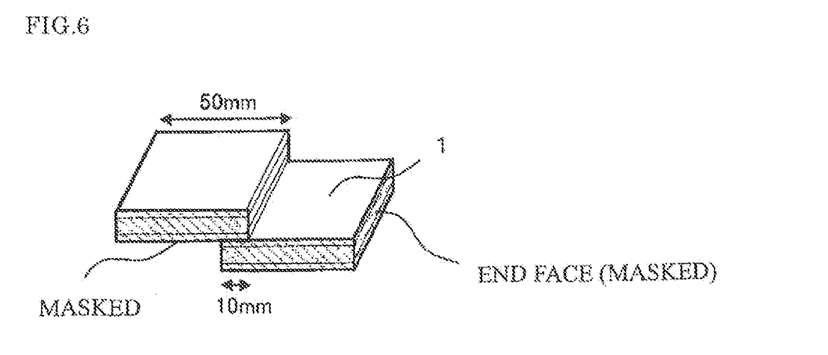
FIG. 6 is a view illustrating the state (before brazing) of a specimen used for a corrosion test A.

The clad material was cut to have a size of 50×50 mm, and two clad materials were secured using a jig so that the cladding material 1 and the cladding material 2 overlapped each other by 10 mm (see FIG. 6). About 5 g/m$^2$ of a fluoride-based flux was applied to each side of the clad materials, and dried. The clad materials were then brazed by heating the clad materials to 600° C. (maximum temperature) in a nitrogen gas atmosphere at an average heating rate of 50° C./min. After masking the cladding material 2 (including the end face), the sample was subjected to a SWAAT test (ASTM-G85-A3) for 12 weeks in order to evaluate corrosion resistance. The corrosion resistance was evaluated as "Good" when perforation corrosion from the cladding material 1 did not occur, and was evaluated as "Bad" when perforation corrosion from the cladding material 1 occurred. The corrosion resistance was evaluated as "Good" when separation due to corrosion did not occur at the joint when 12 weeks had elapsed, and was evaluated as "Bad" when separation due to corrosion occurred at the joint.

Test 5: Corrosion Test B

Figure 7:
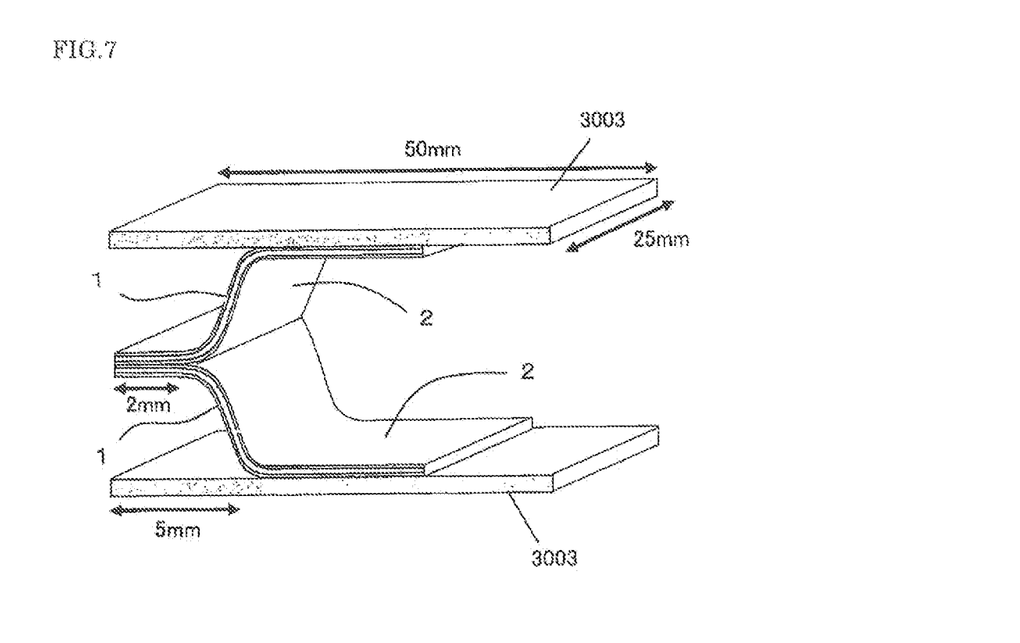
FIG. 7 is a view illustrating the state (before brazing) of a specimen used for a corrosion test B.

The clad material was cut to have a size of 25×50 mm, and pressed. About 5 g/m$^2$ of a fluoride-based flux was applied to each side of the clad material, and dried. Two clad materials were placed so that the cladding materials 2 (non-pressed area) overlapped each other by 2 mm (see FIG. 7), a 3003 alloy sheet (thickness: 1.00 mm, O-temper) was brought into contact with each cladding material 1 (pressed area), and the laminate specimen was secured using a jig. The laminate specimen was then brazed by heating the laminate specimen to 600° C. (maximum temperature) in a nitrogen gas atmosphere at an average heating rate of 50° C./min. After masking the joint between the 3003 alloy sheet and the cladding material 1, the 3003 alloy sheet, and the cladding material 2 (including the end face) so that only the joint between the cladding materials 2 and the cladding material 1 were exposed, the laminate specimen was subjected to a SWAAT test (ASTM-G85-A3) for 12 weeks in order to evaluate corrosion resistance. The corrosion resistance was evaluated as "Good" when perforation corrosion from the cladding material 1 did not occur, and was evaluated as "Bad" when perforation corrosion from the cladding material 1 occurred. The corrosion resistance was evaluated as "Excellent (5)" when separation due to corrosion did not occur at the joint when 12 weeks had elapsed, and less than 10% of the cross-sectional area of the joint was corroded, was evaluated as "Very good (4)" when 10 to 20% of the cross-sectional area of the joint was corroded, was evaluated as "Good (3)" when 20 to 30% of the cross-sectional area of the joint was corroded, was evaluated as "Fair (2)" when 30 to 50% of the cross-sectional area of the joint was corroded, was evaluated as "Almost separated (1)" when 50 to 100% of the cross-sectional area of the joint was corroded, and was evaluated as "Bad" when separation due to corrosion occurred at the joint.

TABLE 1

| | | Cladding material 1 Composition (mass %) | | | | | | | | | Core material Composition (mass %) | | | |
|---|---|---|---|---|---|---|---|---|---|---|---|---|---|---|
| Clad material | Si (X) | Zn | Mn | Sr | Cr | Zr | In | Sn | Ni | Other | Cu | Mn | Cr | Ti |
| 1 | 3 | 4 | 1 | | | | | | | | 0.19 | 1.2 | | 0.15 |
| 2 | 10 | 4 | 1 | | | | | | | | 0.15 | 0.5 | | 0.15 |
| 3 | 5 | 1 | 1 | | | | | | | | 0.15 | 1.8 | | 0.15 |
| 4 | 5 | 10 | 1 | | | | | | | | 0.15 | 1.2 | 0.3 | 0.15 |
| 5 | 5 | 4 | 0.3 | | | | | | | | 0.15 | 1.2 | | 0.15 |
| 6 | 5 | 4 | 1.8 | | | | | | | | 0.15 | 1.2 | | 0.15 |
| 7 | 5 | 4 | 1 | 0.01 | | | | | | | 0.15 | 1.2 | | 0.15 |
| 8 | 5 | 4 | 1 | 0.05 | | | | | | | 0.15 | 1.1 | | 0.15 |
| 9 | 5 | 5 | 1 | | 0.3 | | | | | | 0.15 | 1.7 | | 0.15 |
| 10 | 5 | 6 | 1 | | | 0.3 | | | | | 0.15 | 1.2 | | 0.15 |
| 11 | 5 | 4 | 1 | | | | 0.001 | | | | 0.18 | 1.3 | | 0.05 |
| 12 | 5 | 4 | 1 | | | | 0.1 | | | | 0.12 | 1.4 | | 0.3 |
| 13 | 5 | 4 | 1 | | | | | 0.001 | | | 0.18 | 1.2 | | 0.15 |
| 14 | 5 | 4 | 1 | | | | | 0.1 | | | 0.12 | 1.2 | | 0.15 |
| 15 | 3.5 | 4 | 1 | | | | | | 0.04 | | 0.1 | 1.2 | | 0.15 |

TABLE 1-continued

| No. | | | | | | | | | | |
|---|---|---|---|---|---|---|---|---|---|---|
| 16 | 3.5 | 4 | 1 | | | | | 0.1 | 1.2 | 0.15 |
| 17 | 8.5 | 4 | 1 | | | | | 0.1 | 1.2 | 0.15 |
| 18 | 5 | 2 | 1 | | | | | 0.1 | 1.2 | 0.15 |
| 19 | 5 | 9 | 1 | | | | | 0.1 | 1.2 | 0.15 |
| 20 | 4 | 4 | 1.3 | | | | | 0.10 | 1.2 | 0.15 |
| 21 | 5 | 4 | 1 | | | | | 0.15 | 1.2 | 0.05 |
| 22 | 5 | 4 | 1 | | | | | 0.08 | 1.2 | |
| 23 | 5 | 4 | 1 | | | | | 0.06 | 0.8 | 0.15 |
| 24 | 6 | 4 | 1 | | | | | 0.06 | 1.5 | |
| 25 | 7 | 4 | 1 | | | | Fe: 0.1 | | 1.2 | 0.15 |
| 26 | 5 | 4 | 1 | | | | Fe: 1.0 | | 1.2 | 0.15 |
| 27 | 6 | 4 | 1 | | | | | | 1.2 | 0.15 |
| 28 | 7 | 4 | 1 | | | | Pb: 0.1 | | 1.2 | 0.15 |
| 29 | 4 | 4 | 1 | | | | Li: 0.1 | | 1.2 | 0.15 |
| 30 | 5.5 | 4 | 1 | | | | Ca: 0.1 | | 1.2 | 0.15 |
| 31 | 4 | 4 | 1 | | | | Na: 0.1 | | 1.2 | 0.15 |
| 32 | 8.5 | 4 | 1 | | | | B: 0.1 | | 1.2 | 0.15 |
| 33 | 8.5 | 3 | 1 | | | | | | 1.2 | 0.15 |
| 34 | 8.5 | 4 | 1 | | | | | | 1.2 | 0.15 |
| 35 | 8.5 | 9 | 1 | | | | | | 1.2 | 0.15 |
| 36 | 8.5 | 4 | 1 | | | | | | 1.2 | 0.15 |
| 37 | 8.5 | 4 | 1 | | | | | | 1.2 | 0.15 |
| 38 | 5 | 4 | 1 | 0.01 | | | | | 1.2 | 0.15 |
| 39 | 4.5 | 4 | 1 | 0.01 | | | | | 1.2 | 0.15 |
| 40 | 4.5 | 4 | 1 | 0.01 | | | | | 1.2 | 0.15 |
| 41 | 3.5 | 4 | 1 | 0.01 | | | | | 1.2 | 0.15 |
| 42 | 4 | 4 | | | | | | | 1.2 | 0.15 |
| 43 | 5 | 4 | 1 | | | | | 0.055 | 1.2 | 0.15 |
| 44 | 5 | 4 | 1 | 0.01 | | | | 0.06 | 1.1 | 0.15 |

| Clad material | Core material Composition (mass %) | | | Cladding material 2 Composition (mass %) | | | | Y − X (%) |
|---|---|---|---|---|---|---|---|---|
| | Zr | Mg | Other | Si (Y) | Sr | Cu | Other | |
| 1 | | | | 3 | | | | 0 |
| 2 | | | | 13 | | | | 3 |
| 3 | | | | 8 | 0.01 | | | 3 |
| 4 | | | | 8 | 0.05 | | | 3 |
| 5 | 0.3 | | | 8 | | 0.05 | | 3 |
| 6 | | 0.5 | | 8 | | 0.03 | | 3 |
| 7 | | | | 5 | | | | 0 |
| 8 | | | | 5.2 | | | | 0.2 |
| 9 | | | | 5.5 | | | | 0.5 |
| 10 | 0.3 | | | 6 | | | | 1 |
| 11 | | | | 6.5 | | | | 1.5 |
| 12 | | | | 7 | | | | 2 |
| 13 | | | | 7.5 | | | | 2.5 |
| 14 | | | | 8.5 | | | | 3.5 |
| 15 | | | | 10 | | | | 6.5 |
| 16 | | | | 11 | | | | 7.5 |
| 17 | | | | 8.5 | | | | 0 |
| 18 | | | | 12 | | | | 7 |
| 19 | | | | 8.5 | | | | 3.5 |
| 20 | | | | 12.7 | | | | 8.7 |
| 21 | | | | 8.5 | | | | 3.5 |
| 22 | | | | 8.5 | | | | 3.5 |
| 23 | | | | 8.5 | | | | 3.5 |
| 24 | | | | 8.5 | | | | 2.5 |
| 25 | | | Fe: 0.1 | 8.5 | | | Fe: 0.1 | 1.5 |
| 26 | | | Fe: 1.0 | 9 | | | Fe: 1.0 | 4 |
| 27 | | | Ni: 0.1 | 9.5 | | | Ni: 0.1 | 3.5 |
| 28 | | | Pb: 0.1 | 10 | | | Pb: 0.1 | 3 |
| 29 | | | Li: 0.1 | 12.5 | | | Li: 0.1 | 8.5 |
| 30 | | | Ca: 0.1 | 13 | | | Ca: 0.1 | 7.5 |
| 31 | | | Na: 0.1 | 13 | | | Na: 0.1 | 9 |
| 32 | | | B: 0.1 | 7 | | | B: 0.1 | −1.5 |
| 33 | | | | 7.5 | | | | −1 |
| 34 | | | | 8.5 | | | | 0 |
| 35 | | | | 9 | | | | 0.5 |
| 36 | | | | 7.5 | | | | −1 |
| 37 | | | | 8.5 | | | | 0 |
| 38 | | | | 9 | | | | 4 |
| 39 | | | | 11 | | | | 6.5 |
| 40 | | | | 12 | | | | 7.5 |
| 41 | | | | 11.5 | | | | 8 |
| 42 | 0.3 | | | 3 | | | | −1 |

TABLE 1-continued

| | | | |
|---|---|---|---|
| 43 | 8 | 0.01 | 3 |
| 44 | 8 | 0.05 | 3 |

TABLE 2

| Clad material | Test 1 Tensile strength (>70 MPa) | Test 2 Inverted-T test (flow factor ≥ 0.15) | Test 3 Mini-core test (flow factor ≥ 0.05) | Test 4 Corrosion test A | | Test 5 Corrosion test B | |
|---|---|---|---|---|---|---|---|
| | | | | Perforation after 12 weeks | Separation at joint after 12 weeks | Perforation after 12 weeks | Separation at joint after 12 weeks |
| 1 | Good | Good | Good | Good | Good | Good | 3 |
| 2 | Good | Good | Good | Good | Good | Good | 5 |
| 3 | Good | Good | Good | Good | Good | Good | 5 |
| 4 | Good | Good | Good | Good | Good | Good | 5 |
| 5 | Good | Good | Good | Good | Good | Good | 5 |
| 6 | Good | Good | Good | Good | Good | Good | 5 |
| 7 | Good | Good | Good | Good | Good | Good | 3 |
| 8 | Good | Good | Good | Good | Good | Good | 4 |
| 9 | Good | Good | Good | Good | Good | Good | 5 |
| 10 | Good | Good | Good | Good | Good | Good | 5 |
| 11 | Good | Good | Good | Good | Good | Good | 5 |
| 12 | Good | Good | Good | Good | Good | Good | 5 |
| 13 | Good | Good | Good | Good | Good | Good | 5 |
| 14 | Good | Good | Good | Good | Good | Good | 5 |
| 15 | Good | Good | Good | Good | Good | Good | 5 |
| 16 | Good | Good | Good | Good | Good | Good | 4 |
| 17 | Good | Good | Good | Good | Good | Good | 3 |
| 18 | Good | Good | Good | Good | Good | Good | 4 |
| 19 | Good | Good | Good | Good | Good | Good | 5 |
| 20 | Good | Good | Good | Good | Good | Good | 2 |
| 21 | Good | Good | Good | Good | Good | Good | 5 |
| 22 | Good | Good | Good | Good | Good | Good | 5 |
| 23 | Good | Good | Good | Good | Good | Good | 5 |
| 24 | Good | Good | Good | Good | Good | Good | 5 |
| 25 | Good | Good | Good | Good | Good | Good | 5 |
| 26 | Good | Good | Good | Good | Good | Good | 5 |
| 27 | Good | Good | Good | Good | Good | Good | 5 |
| 28 | Good | Good | Good | Good | Good | Good | 5 |
| 29 | Good | Good | Good | Good | Good | Good | 3 |
| 30 | Good | Good | Good | Good | Good | Good | 4 |
| 31 | Good | Good | Good | Good | Good | Good | 2 |
| 32 | Good | Good | Good | Good | Good | Good | 2 |
| 33 | Good | Good | Good | Good | Good | Good | 2 |
| 34 | Good | Good | Good | Good | Good | Good | 3 |
| 35 | Good | Good | Good | Good | Good | Good | 5 |
| 36 | Good | Good | Good | Good | Good | Good | 2 |
| 37 | Good | Good | Good | Good | Good | Good | 3 |
| 38 | Good | Good | Good | Good | Good | Good | 5 |
| 39 | Good | Good | Good | Good | Good | Good | 5 |
| 40 | Good | Good | Good | Good | Good | Good | 4 |
| 41 | Good | Good | Good | Good | Good | Good | 3 |
| 42 | Good | Good | Good | Good | Good | Good | 2 |
| 43 | Good | Good | Good | Good | Good | Good | 5 |
| 44 | Good | Good | Good | Good | Good | Good | 5 |

As shown in Table 2, Specimens 1 to 44 according to the invention had a tensile strength of more than 70 MPa or more after brazing, a flow factor (cladding material 2) determined by the inverted-T test of 0.15 or more, and a flow factor (cladding material 2) determined by the mini-core test of 0.05 or more. Perforation corrosion and separation due to corrosion did not occur when Specimens 1 to 44 were subjected to the SWAAT test for 12 weeks (i.e., Specimens 1 to 44 exhibited excellent brazability and excellent corrosion resistance).

Comparative Example 1

Each of an aluminum alloy for producing an external surface cladding material (cladding material 1) having the composition shown in Table 3, an aluminum alloy for producing a core material having the composition shown in Table 3, and an aluminum alloy for producing an internal surface cladding material (cladding material 2) having the composition shown in Table 3, was subjected to continuous casting, and the resulting ingot was processed in the same manner as in Example 1 to produce a three-layer clad material (O-temper material) having a thickness of 0.30 mm. The clad material was subjected to Tests 1 to 5 in the same manner as in Example 1 to evaluate the brazability and the corrosion resistance. The test results are shown in Table 4. In Table 3, the values that fall outside the scope of the invention are underlined.

TABLE 3

| Clad material | Cladding material 1 Composition (mass %) | | | | | | | | | Core material Composition (mass %) | | | | | | Cladding material 2 Composition (mass %) | | | Y − X (%) |
|---|---|---|---|---|---|---|---|---|---|---|---|---|---|---|---|---|---|---|---|
| | Si (X) | Zn | Mn | Sr | Cr | Zr | In | Sn | Ni | Cu | Mn | Cr | Ti | Zr | Mg | Si (Y) | Sr | Cu | |
| 45 | 3 | 4 | 1 | | | | | | | | 1.2 | 0.15 | | | | 12.2 | | | 9.2 |
| 46 | 3.5 | 4 | 1 | | | | | | | | 1.2 | 0.15 | | | | 13 | | | 9.5 |
| 47 | 8.5 | 4 | 1 | | | | | | | | 1.2 | 0.15 | | | | 3 | | | −5.5 |
| 48 | 8.5 | 4 | 1 | | | | | | | | 1.2 | 0.15 | | | | 5 | | | −3.5 |
| 49 | 8.5 | 4 | 1 | | | | | | | | 1.2 | 0.15 | | | | 6.5 | | | −2 |
| 50 | 3 | 4 | 1 | | | | | | | | 1.2 | 0.15 | | | | 12.3 | | | 9.3 |
| 51 | 3 | 4 | 1 | | | | | | | | 1.2 | 0.15 | | | | 12.5 | | | 9.5 |
| 52 | 3 | 4 | 1 | | | | | | | | 1.2 | 0.15 | | | | 12.7 | | | 9.7 |
| 53 | 3 | 4 | 1 | | | | | | | | 1.2 | 0.15 | | | | 13 | | | 10 |
| 54 | 2 | 4 | 1 | | | | | | | 0.19 | 1.2 | 0.15 | | | | 2 | | | 0 |
| 55 | 4 | 4 | 1 | 0.01 | | | | | | | 0.5 | 0.15 | | | | 14 | | | 10 |
| 56 | 5 | 0.5 | 1 | | | | | | | | 1.8 | 0.15 | | | | 2 | 0.1 | | −3 |
| 57 | 5 | 11 | 1 | | | | | | | | 1.2 | 0.15 | | | | 8.5 | | | 3.5 |
| 58 | 3.5 | 4 | 2 | | | | | | | | 1.2 | 0.3 | 0.15 | 0.5 | | 13 | | | 9.5 |
| 59 | 5 | 4 | 1 | 0.4 | | | | | | | 1.7 | 0.15 | | | | 8 | | 0.05 | 3 |
| 60 | 5 | 4 | 1 | | | 0.4 | | | | | 1.2 | 0.15 | | 0.3 | | 8 | | 0.03 | 3 |
| 61 | 5 | 4 | 1 | | | | 0.0005 | | | 0.2 | 1.2 | 0.15 | | | | 5 | | | 0 |
| 62 | 5 | 4 | 1 | | | | 0.15 | | | | 1.2 | 0.15 | | | | 5.2 | | | 0.2 |
| 63 | 5 | 4 | 1 | | | | | 0.0005 | | | 0.4 | 0.15 | | | | 5.5 | | | 0.5 |
| 64 | 5 | 4 | 1 | | | | | 0.15 | | | 1.2 | 0.15 | | | | 6 | | | 1 |
| 65 | 5 | 4 | 1 | | | | | | 0.06 | | 1.2 | 0.15 | | | | 6.5 | | | 1.5 |
| 66 | 5 | 4 | 1 | 0.01 | | | | | | | 1.9 | 0.15 | | | | 7 | | | 2 |
| 67 | 5 | 4 | 1 | 0.01 | | | | | | | 1.2 | 0.4 | 0.15 | | | 7.5 | | | 2.5 |
| 68 | 5 | 4 | 1 | 0.01 | | | | | | | 1.2 | | 0.15 | 0.4 | | 8.5 | | | 3.5 |
| 69 | 5 | 4 | 1 | 0.01 | | | | | | | 1.2 | | 0.15 | | 0.6 | 9 | | | 4 |
| 70 | 11 | 4 | 1 | | | | | | | 0.19 | 1.2 | 0.15 | | | | 4 | | | −7 |
| 71 | 5 | 4 | 1 | 0.01 | | | | | | 0.19 | 1.2 | 0.15 | | | | 8 | | 0.1 | 3 |
| 72 | 5 | 4 | 1 | | | | | | | | 1.2 | 0.35 | | | | 8.5 | | | 3.5 |

TABLE 4

| Clad material | Test 1 Tensile strength (>70 MPa) | Test 2 Inverted-T test (flow factor ≥ 0.15) | Test 3 Mini-core test (flow factor ≥ 0.05) | Test 4 Corrosion test A | | Test 5 Corrosion test B | |
|---|---|---|---|---|---|---|---|
| | | | | Perforation after 12 weeks | Separation at joint after 12 weeks | Perforation after 12 weeks | Separation at joint after 12 weeks |
| 45 | Good | Good | Good | Good | Good | Bad | 5 |
| 46 | Good | Good | Good | Good | Good | Bad | 5 |
| 47 | Good | Good | Good | Good | Good | Good | Bad |
| 48 | Good | Good | Good | Good | Good | Good | Bad |
| 49 | Good | Good | Good | Good | Good | Good | 1 |
| 50 | Good | Good | Good | Good | Good | Bad | 5 |
| 51 | Good | Good | Good | Good | Good | Bad | 5 |
| 52 | Good | Good | Good | Good | Good | Bad | 5 |
| 53 | Good | Good | Good | Good | Good | Bad | 5 |
| 54 | Good | Bad | Bad | Good | Good | Good | 3 |
| 55 | — | — | — | — | — | — | — |
| 56 | Good | Bad | Good | Bad | Good | Bad | Bad |
| 57 | Good | Good | Good | Good | Bad | Good | 5 |
| 58 | Good | Good | Bad | Good | Good | Bad | 5 |
| 59 | — | — | — | — | — | — | — |
| 60 | — | — | — | — | — | — | — |
| 61 | Good | Good | Good | Bad | Good | Bad | 3 |
| 62 | Good | Good | Good | Bad | Bad | Bad | 4 |
| 63 | Bad | Good | Good | Good | Good | Good | 5 |
| 64 | Good | Good | Good | Bad | Bad | Bad | 5 |
| 65 | Good | Good | Good | Bad | Good | Bad | 5 |
| 66 | — | — | — | — | — | — | — |
| 67 | — | — | — | — | — | — | — |
| 68 | — | — | — | — | — | — | — |
| 69 | Good | Bad | Bad | — | — | — | — |
| 70 | Good | Good | Good | Bad | Good | Bad | Bad |
| 71 | Good | Good | Good | Bad | Good | Bad | 5 |
| 72 | Good | Good | Good | Bad | Good | Bad | 5 |
| 73 | — | — | — | — | — | — | — |

As shown in Table 4, Specimens 45, 46, 50, 51, 52, and 53 in which the difference (Y−X) between the Si content in the cladding material 1 and the Si content in the cladding material 2 was large, exhibited insufficient corrosion resistance, and perforation corrosion occurred when the specimen was subjected to the SWAAT test for 12 weeks (Test 5 (corrosion test B)), since the liquid filler metal flowed from the cladding material 2 toward the cladding material 1, and the surface Zn concentration in the cladding material 1 decreased. Specimens 47, 48, and 49 in which the value (Y−X) was small, showed separation at the joint when the specimen was subjected to the SWAAT test for 12 weeks (Test 5 (corrosion test B)), since Zn was concentrated at the joint.

Specimen 54 had a flow factor determined by the mini-core test of less than 0.05 since the Si concentration in the cladding material 1 was low, and had a flow factor determined by the inverted-T test of less than 0.15 since the Si concentration in the cladding material 2 was low. Specimen 55 showed significant edge cracking during rolling (i.e., a clad material could not be produced) since the Si concentration in the cladding material 2 was high, and primary-phase Si was crystallized.

Specimen 56 exhibited insufficient corrosion resistance since the Zn concentration in the cladding material 1 was low, and perforation corrosion occurred when the specimen was subjected to the SWAAT test for 12 weeks. Specimen 56 in which the value (Y−X) was small, showed separation at the joint when the specimen was subjected to the SWAAT test for 12 weeks (Test 5 (corrosion test B)) since Zn was concentrated at the joint, and had a flow factor determined by the inverted-T test of less than 0.15 since the Si concentration in the cladding material 2 was low. The Si particles included in the cladding material 2 were not refined during brazing since the Sr concentration in the cladding material 2 was high. When Specimen 57 was subjected to the SWAAT test for 12 weeks (Test 4 (corrosion test A)), Zn was concentrated in the fillet, and separation occurred at the joint, since the Zn concentration in the cladding material 1 was high.

Specimen 58 had a flow factor determined by the mini-core test of less than 0.05 since the Mn concentration in the cladding material 1 was high. Specimen 59 showed significant edge cracking during rolling (i.e., a clad material could not be produced) since the Cr concentration in the cladding material 1 was high. Specimen 60 showed significant edge cracking during rolling (i.e., a clad material could not be produced) since the Zr concentration in the cladding material 1 was high. Specimen 61 exhibited insufficient corrosion resistance due to diffusion of Cu into the cladding material 1 since the Cu concentration in the core material was high, and perforation corrosion occurred when the specimen was subjected to the SWAAT test for 12 weeks.

Specimen 62 had a problem in that the corrosion rate of the cladding material 1 was high since the In concentration in the cladding material 1 was high, and perforation corrosion occurred when the specimen was subjected to the SWAAT test for 12 weeks. Moreover, the joint was significantly corroded, and separation occurred when the specimen was subjected to the SWAAT test for 12 weeks.

Specimen 63 had a tensile strength of 70 MPa or less since the Mn concentration in the core material was low. Specimen 64 had a problem in that the corrosion rate of the cladding material 1 was high since the Sn concentration in the cladding material 1 was high, and perforation corrosion occurred when the specimen was subjected to the SWAAT test for 12 weeks. Moreover, the joint was significantly corroded, and separation occurred when the specimen was subjected to the SWAAT test for 12 weeks. Specimen 65 had a problem in that the corrosion rate of the cladding material 1 was high since the Ni concentration in the cladding material 1 was high, and perforation corrosion occurred when the specimen was subjected to the SWAAT test for 12 weeks. Specimen 66 showed significant edge cracking during rolling (i.e., a clad material could not be produced) since the Mn concentration in the core material was high. Specimen 67 showed significant edge cracking during rolling (i.e., a clad material could not be produced) since the Cr concentration in the core material was high. Specimen 68 showed significant edge cracking during rolling (i.e., a clad material could not be produced) since the Zr concentration in the core material was high.

Specimen 69 could not be brazed since the Mg concentration in the core material was high, and had a flow factor determined by the mini-core test of less than 0.05. Specimen 69 had a flow factor determined by the inverted-T test of less than 0.15. Moreover, the SWAAT test could not be performed since a joint could not be obtained by brazing. Specimen 70 had a problem in that Zn flowed during brazing, and could not serve as a sacrificial anode material since the Si concentration in the cladding material 1 was high, and perforation corrosion occurred when the specimen was subjected to the SWAAT test for 12 weeks. Moreover, since the value (Y−X) was small, Zn was concentrated at the joint, and separation occurred at the joint when the specimen was subjected to the SWAAT test for 12 weeks (Test 5 (corrosion test B)). Specimen 71 exhibited insufficient corrosion resistance since the Cu concentration in the cladding material 2 was high, and Cu flowed toward the surface of the cladding material 1, and perforation corrosion occurred when the specimen was subjected to the SWAAT test for 12 weeks. Specimen 72 showed significant edge cracking during rolling (i.e., a clad material could not be produced) since the Ti concentration in the core material was high.

REFERENCE SIGNS LIST

1 Cladding material 1
2 Cladding material 2
3 Core material
4 Refrigerant passage
5 Bare fin

The invention claimed is:
1. An aluminum alloy clad material for heat exchangers that is a three-layer clad material that comprises a core material, a first cladding material, and a second cladding material, one side of the core material being clad with the first cladding material, the other side of the core material being clad with the second cladding material,
    the core material comprising an aluminum alloy that consists of 0.5 to 1.8 mass % of Mn, and either or both of Cu and Ti, wherein if Cu is present the amount is more than 0.05 mass % and less than 0.2 mass %, and if Ti is present the amount is 0.05 to 0.30 mass % of Ti, optionally either or both of 0.30 mass % or less of Cr and 0.30 mass % or less of Zr, and optionally 0.5 mass % or less of Mg with the balance being Al and unavoidable impurities,
    the first cladding material comprising an aluminum alloy that comprises 3 to 10 mass % of Si, and 1 to 10 mass % of Zn, with the balance being Al and unavoidable impurities, and the second cladding material comprising an aluminum alloy that comprises 3 to 13 mass % of Si, and 0.05 mass % or less of Cu, with the balance being Al and unavoidable impurities, wherein an Si content X (%) in the first cladding material and an Si content Y (%) in the second cladding material satisfy a value (Y–X) is 0.2 to 9%, the first cladding material and the second cladding material have different compositions, and the aluminum alloy clad material is used in a state in which the first cladding material comes on an air side.

2. The aluminum alloy clad material according to claim 1, wherein the first cladding material further comprises 0.3 to 1.8 mass % of Mn.

3. The aluminum alloy clad material according to claim 1, wherein the first cladding material further comprises 0.005 to 0.05 mass % of Sr.

4. The aluminum alloy clad material according to claim 1, wherein the first cladding material further comprises either or both of 0.30 mass % or less of Cr and 0.30 mass % or less of Zr.

5. The aluminum alloy clad material according to claim 1, wherein the first cladding material further comprises either or both of 0.001 to 0.10 mass % of In and 0.001 to 0.10 mass % of Sn.

6. The aluminum alloy clad material according to claim 1, wherein the first cladding material has an Ni content of less than 0.05 mass %.

7. The aluminum alloy clad material according to claim 1, wherein the second cladding material further comprises 0.005 to 0.05 mass % of Sr.

* * * * *